Patented Feb. 5, 1952

2,584,140

UNITED STATES PATENT OFFICE 2,584,140

ISOMERS OF DIELS-ALDER ADDUCTS OF HEXAHALOCYCLOPENTADIENE WITH QUINONES

Edward Segel, Rex E. Lidov, and Julius Hyman, Denver, Colo.; said Segel and said Lidov assignors to Velsicol Corporation, Chicago, Ill., a corporation of Illinois No Drawing. Application August 7, 1948, Serial No. 43,153

12 Claims. (Cl. 260—625)

This invention relates to new compositions of matter and to methods of preparation of said compositions.

The compounds which are the subject of this invention are useful as fungicides, bactericides, insecticides, and are further useful as intermediates to produce other valuable materials which may have a diversity of uses.

More specifically, this invention is concerned with the rearrangement of or isomerization to hydroquinones of the Diels-Alder adducts of hexahalocyclopentadienes and quinones. Such Diels-Alder adducts have been disclosed and claimed in the copending application by Lidov, Hyman and Segel, Serial No. 794,204, filed December 27, 1947.

The present invention is concerned with those products of the aforementioned reactants wherein the structure to be rearranged has contained therein a 1,4-diketonecyclohexene-2 ring structure, and further contains a hydrogen atom in each of the two angular positions formed when the two aforementioned reactants combine.

Thus, specific compounds exemplary of those which can be rearranged to form hydroquinones according to the present process are represented by the following formulas:

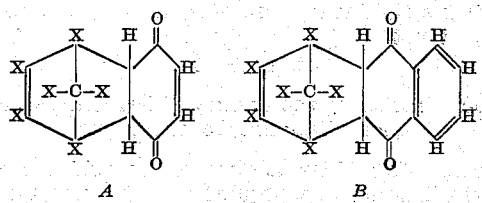

Where X is either chlorine, bromine or mixtures thereof. Thus, compound A is the Diels-Alder reaction product of a hexahalocyclopentadiene as previously described and benzoquinone. Compound B is the reaction product of a hexahalocyclopentadiene as previously described and naphthoquinone.

Diels-Alder adducts of a hexahalocyclopentadiene and a quinone of the group having the formula:

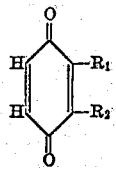

and

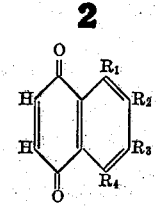

wherein $R_1$, $R_2$, $R_3$ and $R_4$ are of the group consisting of hydrogen, halogen, and organic radicals are applicable to the present process.

The rearrangement reaction of quinone adducts typified and described above can be generically represented as follows:

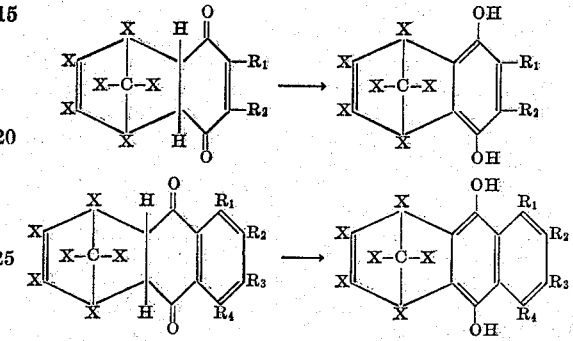

wherein X is halogen as previously described and $R_1$, $R_2$, $R_3$ and $R_4$ are chosen from the group hydrogen, halogen and organic radicals.

Thus, in the first reaction above, $R_1$ may, for example, be hydrogen, chlorine, bromine or a phenyl, methyl, ethyl, or other group, while $R_2$ is hydrogen, chlorine, bromine, or a phenyl, methyl, ethyl, or other group.

Similarly, in the latter reaction above represented, $R_1$, $R_2$, $R_3$ and $R_4$, may all, or any of them, be hydrogen, chlorine, bromine, or methyl, ethyl, and phenyl groups, or the like.

Broadly, the rearrangement reaction herein described may be effected by mildly heating the aforementioned Diels-Alder adducts in a basic medium for a relatively short period of time.

More specifically, and to further exemplify without restricting those compounds which can be utilized in the present process, the following structures are presented:

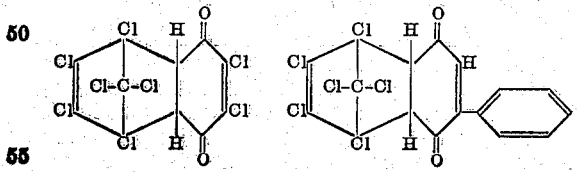

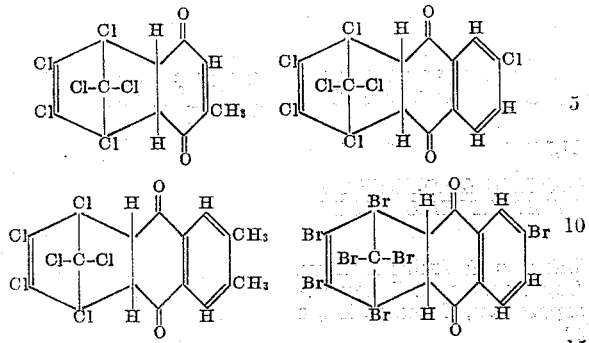

The temperature of reaction may vary between about normal room temperature to about 200° C. and preferably between about 60 to about 120° C. At below about normal room temperature, the reaction proceeds too slowly to be accomplished advantageously. Diluents for the reaction may be such solvents as methanol, ethanol, benzene, hexane, heptane and the like. For ease of operation, the reaction is generally accomplished at the reflux temperature of the solvent utilized, and since the particular solvent utilized is generally not critical, many suitable solvents for accomplishing the present reaction will be suggested to one skilled in the art.

The base utilized may be organic, such as morpholine, pyridine, triethanol amine, aniline, butyl amine, and the like, or may be inorganic, such as ammonia, sodium hydroxide or potassium hydroxide. The type of base best utilized in each specific instance will depend to some extent on the type of solvent or diluent utilized. Thus, sodium and potassium hydroxide are well suited if the reaction takes place in methanol or ethanol. On the other hand, pyridine or triethanol amine are well suited if the reaction takes place in benzene, hexane, methanol and the like.

The amount of base utilized may vary over a fairly wide range, and an extremely small amount can effect rapid rearrangement. Thus, methanol, having a pH of about 7.4 is sufficiently basic to effect rearrangement at a reasonable rate. Increasing the concentration of base increases the rate of reaction.

To more fully illustrate the present process, the following examples are presented for purposes of illustration and are not intended to limit the invention in any way.

EXAMPLE 1

*Isomerization of the adduct of hexachlorocyclopentadiene and benzoquinone*

The Diels-Alder adduct of hexachlorocyclopentadiene and benzoquinone (80 g.) was dissolved in boiling methanol (pH=7.3) and refluxed for six hours. The mixture was then cooled to room temperature and chilled in an ice bath; this resulted in the deposition of white solid which was identified as the hydroquinone obtained by rearrangement of the starting adduct.

EXAMPLE 2

*Isomerization of the adduct of hexachlorocyclopentadiene and phenylbenzoquinone*

The Diels-Alder adduct of hexachlorocyclopentadiene and phenylbenzoquinone (2.0 g.) was dissolved in methanol to which five drops of pyridine had been added. The mixture was refluxed for about one-half hour (solution decolorized in about 10 minutes) and then a few drops sulfuric acid were added. The solution was evaporated to about one-half volume and then water was added to precipitate a white solid which was identified as the hydroquinone obtained by rearrangement of the starting adduct.

EXAMPLE 3

*Isomerization of the adduct of hexachlorocyclopentadiene and toluquinone*

The Diels-Alder adduct of hexachlorocyclopentadiene and toluquinone (3.7 g.) was dissolved in a mixture of methanol and ethanol. Pyridine (1.5 ml.) was added and the mixture was refluxed for two hours. The mixture was acidified, reduced in volume, diluted with water and chilled. This resulted in the precipitation of a white solid identified as the hydroquinone obtained by rearrangement of the starting adduct.

EXAMPLE 4

*Isomerization of the adduct of hexachlorocyclopentadiene and benzoquinone*

The Diels-Alder adduct of hexachlorocyclopentadiene and benzoquinone (2.0 g.) was dissolved in benzene to which was added pyridine (1 ml.). The mixture was refluxed for one hour. The solution became colorless, and upon removing the benzene solvent by distillation in vacuo, a white solid was obtained which was recrystallized from a hexane-benzene mixture. The thus obtained crystalline material was identified as the hydroquinone obtained by rearrangement of the starting adduct.

EXAMPLE 5

*Isomerization of the adduct of hexabromocyclopentadiene and benzoquinone*

The Diels-Alder adduct of hexabromocyclopentadiene and benzoquinone (10 g.) was mixed with methanol (125 ml.) and to this mixture was added pyridine (75 drops). The mixture was gradually heated on a steam bath until boiling occurred, and the mixture was then refluxed for 40 minutes. The mixture was then chilled and filtered to recover the white crystalline hydroquinone obtained by rearrangement of the starting adduct.

EXAMPLE 6

*Isomerization of the adduct of hexachlorocyclopentadiene and benzoquinone*

The Diels-Alder adduct of hexachlorocyclopentadiene and benzoquinone (3 g.) was placed in methanol (20 ml.), and to this mixture was added five drops of morpholine. After refluxing the mixture for 15 minutes, it was chilled, and the deposited white crystals were identified as the hydroquinone obtained by rearrangement of the starting adduct.

EXAMPLE 7

Example 6 was repeated except that triethanol amine was used in place of morpholine. The hydroquinone obtained by rearrangement of the starting adduct was again obtained.

EXAMPLE 8

*Isomerization of the Adduct of Hexachlorocyclopentadiene and Benzoquinone*

The Diels-Alder adduct of hexachlorocyclopentadiene and benzoquinone (3 g.) was dissolved in methanol (20 ml.) having sodium hydroxide (0.25 g.) dissolved therein. The mixture was heated on a steam bath for about five minutes, was then cooled, slightly acidified with hydrochloric acid, and the resultant precipitate was filtered and washed with water. The white crystalline material, thus obtained, was identified as the hydroquinone obtained by rearrangement of the starting adduct.

The examples hereinbefore listed are obviously not completely comprehensive as to possible variations in technique and procedure, and various modifications thereof will be suggested to those skilled in the art without departing from the scope or spirit of the invention.

As a non-fully equivalent alternative to the process as hereinbefore related, rearrangement or isomerization of the previously defined adducts to form hydroquinones may be effected by heating said adducts (between about 100-200° C.) in relatively concentrated sulfuric acid (containing in excess of about 50% acid) for short periods of time. Thus, heating the adduct of hexachlorocyclopentadiene and benzoquinone in 98%, 95%, 90% and 80% sulfuric acid for periods of time from about five to about 30 minutes at temperatures of from about 110° C. to about 180° C. resulted in the formation of the isomerized product herein concerned.

The hydroquinones obtained according to the present process are valuable compounds in that they exhibit excellent bactericidal, fungicidal, and insecticidal properties. In addition thereto, the products of the present process are useful intermediates in the preparation of other new and valuable materials.

Thus, the hydroquinones formed by rearranging the Diels-Alder adduct of a hexahalocyclopentadiene and a quinone, may be oxidized to form a new quinone. Further, said isomerized adducts can be halogenated to introduce one or more halogen atoms such as chlorine, or such isomerized adducts may be acetylated or otherwise treated in known and conventional manner to obtain new and unique compositions having a multiplicity of uses in large and widely varied fields.

We claim as our invention:

1. A new composition of matter comprising the material chosen from the group having the formula:

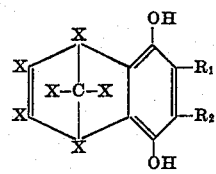

and

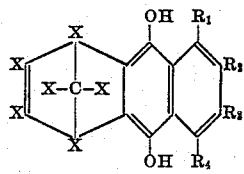

wherein X is a halogen of the group consisting of chlorine and bromine and $R_1$, $R_2$, $R_3$ and $R_4$ are of the group consisting of hydrogen, halogen and, alkyl and aryl radicals.

2. A new composition of matter comprising a hydroquinone isomer of the Diels-Alder adduct of a hexahalocyclopentadiene and a quinone of the group having the formula

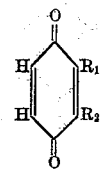

and

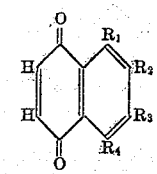

wherein $R_1$, $R_2$, $R_3$ and $R_4$ are of the group consisting of hydrogen, halogen, alkyl and aryl radicals.

3. A composition according to claim 2, wherein the hexahalocyclopentadiene is hexachlorocyclopentadiene.

4. A composition according to claim 2, wherein the quinone is benzoquinone.

5. As a new composition of matter, the hydroquinone isomer of the Diels-Alder adduct of hexachlorocyclopentadiene and benzoquinone.

6. As a new composition of matter, the hydroquinone isomer of the Diels-Alder adduct of hexachlorocyclopentadiene and naphthoquinone.

7. As a new composition of matter, the hydroquinone isomer of the Diels-Alder adduct of hexachlorocyclopentadiene and phenylbenzoquinone.

8. As a new composition of matter, the hydroquinone isomer of the Diels-Alder adduct of hexachlorocyclopentadiene and toluquinone.

9. As a new composition of matter, the hydroquinone isomer of the Diels-Alder adduct of hexabromocyclopentadiene and benzoquinone.

10. The method of forming the hydroquinone isomer of the Diels-Alder adduct of a hexahalocyclopentadiene and a quinone of the group having the formula:

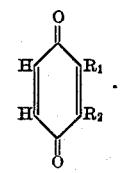

and

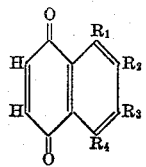

wherein $R_1$, $R_2$, $R_3$ and $R_4$ are of the group consisting of hydrogen, halogen, alkyl and aryl radicals, which comprises reacting said adduct in a basic medium.

11. The method of forming the hydroquinone isomer of the Diels-Alder adduct of a hexahalocyclopentadiene, wherein the halogen substituents are of the group consisting of chlorine and bromine, and a quinone of the group having the formula:

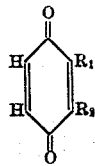

and

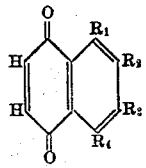

wherein $R_1$, $R_2$, $R_3$ and $R_4$ are of the group consisting of hydrogen, halogen alkyl and aryl radicals, which comprises reacting said adduct contained in a diluent in the presence of a basic catalyst at a temperature of about normal room temperature to about 200° C.

12. The process of claim 11, wherein the temperature is about 60 to about 120° C. and the diluent is a solvent for the reactants.

EDWARD SEGEL.
REX E. LIDOV.
JULIUS HYMAN.

REFERENCES CITED

The following references are of record in the file of this patent:

Norton, Chem. Reviews, vol. 31, page 340 (1942) (1 page only). Entire article pages 319–523.

Prill, J. Am. Chem. Soc., vol. 69, pages 62–63 (1947) (2 pages).